United States Patent
Nakayama et al.

(10) Patent No.: US 7,999,903 B2
(45) Date of Patent: Aug. 16, 2011

(54) LIQUID CRYSTAL DISPLAY DEVICE HAVING COLUMNAR SPACERS FORMED ON FIRST AND SECOND ELONGATED SUPPORT LAYERS

(75) Inventors: Takanori Nakayama, Mobara (JP); Atsuhiro Katayama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 426 days.

(21) Appl. No.: 12/230,365

(22) Filed: Aug. 28, 2008

(65) Prior Publication Data
US 2009/0059155 A1    Mar. 5, 2009

(30) Foreign Application Priority Data
Aug. 30, 2007   (JP) ................. 2007-224103

(51) Int. Cl.
*G02F 1/1339* (2006.01)
(52) U.S. Cl. ...................................... 349/155
(58) Field of Classification Search .......... 349/155–157
See application file for complete search history.

(56) References Cited

U.S. PATENT DOCUMENTS

| | | | |
|---|---|---|---|
| 6,798,486 B2 | 9/2004 | Yanagawa et al. | |
| 7,495,739 B2 | 2/2009 | Hirato et al. | |
| 7,502,090 B2 | 3/2009 | Oh et al. | |
| 2005/0264749 A1* | 12/2005 | Lee | 349/156 |
| 2007/0098921 A1* | 5/2007 | Liang et al. | 428/1.5 |

FOREIGN PATENT DOCUMENTS
JP    2005-338770    12/2005
* cited by examiner

*Primary Examiner* — Mark A Robinson
*Assistant Examiner* — Paul C Lee
(74) *Attorney, Agent, or Firm* — Antonelli, Terry, Stout & Kraus, LLP.

(57) ABSTRACT

To implement a support layer which is smaller than in the prior art with a stable contact area with the spacers in columnar form even in the case where the spacers in columnar form are miniaturized.

A liquid crystal display device is provided with: a first substrate; a second substrate; and a liquid crystal display panel having liquid crystal sandwiched between the above described first substrate and the above described second substrate, and characterized in that the above described second substrate has spacers in columnar form, the above described first substrate has a support layer in a region where the above described spacers in columnar form are formed, the above described support layer has: a first layer extending in a first direction; and a second layer formed on the above described first layer and extending in a second direction which crosses the above described first direction at an angle of 70° to 110°, and the surface of the above described spacers in columnar form on the above described first substrate side faces the portion where the above described first layer of the above described support layer and the above described second layer overlap. The above described first layer and the above described second layer of the above described support layer are rectangular in a plan view. The above described first layer is a semiconductor layer and the above described second layer is a metal layer.

9 Claims, 5 Drawing Sheets

LIQUID CRYSTAL DISPLAY DEVICE HAVING COLUMNAR SPACERS FORMED ON FIRST AND SECOND ELONGATED SUPPORT LAYERS

The present application claims priority from Japanese application JP2007-224103 filed on Aug. 30, 2007, the content of which is hereby incorporated by reference into this application.

BACKGROUND OF THE INVENTION (1) Field of the Invention

The present invention relates to a liquid crystal display device, and in particular, to a technology which is effective when the gap between the first substrate and the second substrate is kept constant.

(2) Related Art Statement

Many liquid crystal display devices generally used at present are formed of a pair of substrates (for example glass substrates) and a liquid crystal composite sealed in the gap between these. Concretely, thin film transistors, pixel electrodes, signal lines, gate electrodes, facing electrodes and the like are formed of a semiconductor layer made of amorphous silicon or the like on one substrate (hereinafter referred to as TFT substrate), and a light blocking film, color filters and the like are formed on the other substrate (hereinafter referred to as CF substrate) in an IPS type liquid crystal display device, for example. Thus, in the configuration, the TFT substrate and the CF substrate are arranged so as to face each other at a constant distance by means of spacers, and the gap is sealed with a sealing agent and a liquid crystal composite sealed in.

As for the spacers for keeping the distance constant, in recent years, patterned spacers in columnar form formed directly in the non-display region on the CFR substrate have been frequently used instead of plastic beads having a uniform particle diameter scattered uniformly between the substrates (see Patent Document 1 below).

The following is a prior art document which relates to the present invention.

(Patent Document 1) Japanese Unexamined Patent Publication 2005-338770

SUMMARY OF THE INVENTION

Problem to Be Solved by the Invention

When a liquid crystal display panel is large, problems arise with the liquid crystal display panel, such as "unevenness in the gap caused by high temperatures," "unevenness caused through rubbing" and "unevenness caused through pressing."

"Unevenness in the gap caused by high temperatures" means the creation of unevenness with large gaps in the lower portion of the screen when the liquid crystal inside the liquid crystal display panel expands due to thermal expansion under high temperatures, so that spacers in columnar form are lifted up, allowing the liquid crystal to flow toward the bottom of the screen.

As a measure against "unevenness in the gap caused by high temperatures," it is effective to make the amount of deformation of the spacers in columnar form great when forming the liquid crystal display, so that the spacers in columnar form are not lifted, even when the liquid crystal thermally expands. When the force for pressing the liquid crystal display panel is increased in order to increase the amount of deformation of the spacers in columnar form, however, the friction force between the TFT substrate and the CF substrate increases, so that the shifted TFT substrate and the CF substrate do not return to their original relative position when the screen is rubbed, and thus, there is unevenness (unevenness caused through rubbing).

In addition, though it is possible to reduce the area density of the spacers in columnar form so that the amount of deformation in the spacers in columnar form increases without the friction force between the TFT substrate and the CF substrate increasing, the spacers in columnar form plastically deform, causing unevenness in the gap (unevenness caused through pressing) in the case where the force applied to the spacers in columnar form becomes too great, so that the liquid crystal display panel is pressed too strongly.

Thus, the allowance in terms of the "unevenness in the gap caused by high temperatures," the "unevenness caused through rubbing" and the "unevenness caused through pressing" has a trade-off relationship, and the larger the screen is, the smaller this allowance tends to be.

A method for providing a support layer in the portion having spacers in columnar form on the TFT substrate side has been provided as a method for making the allowance greater for each type of unevenness.

Spacers in columnar form for supporting the liquid crystal display panel in a normal state and spacers in columnar form for supporting the liquid crystal display panel only when the cell gap becomes smaller when an external force is applied are formed by providing a support layer on the TFT substrate side.

As a result, the amount of deformation in the spacers in columnar form can be secured in a normal state and the friction force between the TFT substrate and the CF substrate can be reduced, and thus, a number of spacers in columnar form for supporting the liquid crystal display panel can be increased in the case where a pressing force strong enough that there is danger of causing unevenness is applied.

Thus, in order to make the allowance in terms of the "unevenness in the gap caused by high temperatures," the "unevenness caused through rubbing" and the "unevenness caused through pressing" greater, it is necessary to optimize the area through which the spacers in columnar form make contact with the TFT substrate. Therefore, it is desirable for the area of the support layer on the TFT substrate through which the spacers in columnar form make contact (hereinafter referred to as contact area of spacers in columnar form) to have as little inconsistency as possible. In addition, it is necessary for the thickness of the support layer to be such that the spacers in columnar form are not plastically deformed, and it is desirable for the support layer to be formed of two different layers which are layered on top of each other in order to adjust the thickness.

For this reason, conventional liquid crystal display devices use a support layer formed of a first layer and a second layer formed of on the first layer. In this case, the first layer and the second layer are both in disc form.

Taking the precision with which the second layer is overlapped in the pattern into consideration in the support layer formed of the first layer and the second layer formed on the first layer, however, it is necessary to make the area of the first layer greater. Therefore, it is difficult to apply a conventional support layer to a liquid crystal display panel having a small sub-pixel pitch with high precision.

In this case, though it is possible to reduce the area of the support layer to a certain extent by reducing the area of the second layer in the support layer, the corners of the second layer in the support layer are rounded when the second layer in the support layer is a pattern of small dots, so that the inconsistency in the size becomes great under the influence of fluctuation in the process, and thus, a problem arises, such that the contact area of the spacers in columnar form in the support layer may fluctuate.

The present invention is provided in order to solve the above described problems with the prior art, and an object of the present invention is to provide a technology for liquid crystal display devices which makes it possible to implement a smaller support layer than in the prior art with a stable contact area with the spacers in columnar form even in the case where the spacers in columnar form are miniaturized.

The above described and other objects of the present invention, as well as novel features, which become more clear from the description in the present specification and the accompanying drawings.

Means for Achieving Object

The gist of typical inventions from among the inventions disclosed in the present specification is briefly described below.

(1) A first substrate, a second substrate and a liquid crystal display panel having liquid crystal sandwiched between the above described first substrate and the above described second substrate, are provided so that the above described second substrate has spacers in columnar form, the above described first substrate has a support layer in a region where the above described spacers in columnar form are formed, the above described support layer has: a first layer extending in a first direction; and a second layer formed on the above described first layer and extending in a second direction which crosses the above described first direction at an angle of 70° to 110°, and the surface of the above described spacers in columnar form on the above described first substrate side faces the portion where the above described first layer of the above described support layer and the above described second layer overlap.

(2) In the same structure as in (1), the above described second direction crosses the above described first direction at an angle of 90°.

(3) In the same structure as in (1) or (2), the above described first layer and the above described second layer of the above described support layer are rectangular in a plan view.

(4) In the same structure as in any of (1) to (3), the above described first layer of the above described support layer is a semiconductor layer, and the above described second layer of the above described support layer is a metal layer.

(5) In the same structure as in any of (1) to (3), the above described spacers in columnar form are formed of a photosensitive resin.

(6) In the same structure as in any of (1) to (5), the above described liquid crystal display panel has a number of sub-pixels, the above described first substrate has scanning lines for inputting a scanning voltage into the above described number of sub-pixels, and the above described support layer is provided on the above described scanning lines.

(7) In the same structure as in any of (1) to (5), the above described liquid crystal display panel has a number of sub-pixels, each of the above described number of sub-pixels has a facing electrode, and the above described support layer is provided on the above described facing electrodes.

(8) In the same structure as in (6) or (7), the above described first substrate has an orientation film on the surface on the above described liquid crystal side, and the above described support layer is provided between the first substrate and the above described orientation film.

Effects of the Invention

The effects of typical inventions from among the inventions disclosed in the present specification are briefly described below.

The liquid crystal display device according to the present invention makes it possible to implement a smaller support layer than in the prior art with a stable contact area with the spacers in columnar form even in the case where the spacers in columnar form are miniaturized.

BRIEF DESCRIPTION OF THE DRAWINGS

in FIG. 1;

FIG. 4-1 is a diagram illustrating a support layer according to an embodiment of the present invention;

FIG. 4-2 is a diagram comparing a support layer according to an embodiment of the present invention with a conventional support layer.

EXPLANATION OF SYMBOLS

10 point where spacer in columnar form placed
TFT thin film transistor
SUB1, SUB2 transparent substrates (for example glass substrates)
POL1, POL2 polarizing plates
PAS1, PAS2 interlayer insulating films
OC flattened film
AL1, AL2 orientation films
LC liquid crystal layer
BM light blocking film
CF color filter
PX pixel electrode
SLT slit
CT facing electrode
GL scanning line (gate line)
DL video line (source line or drain line)
SPA spacer in columnar form
MTL support layer
MTL1 first layer in support layer (semiconductor layer)
MTL2 second layer in support layer (metal layer)

DETAILED DESCRIPTION OF THE INVENTION

Best Mode for Carrying out the Invention

In the following, one embodiment of the present invention is described in detail in reference to the drawings.

Here, the same symbols are attached to components having the same function in all of the drawings illustrating the embodiment, and descriptions which are the same are omitted.

The liquid crystal display device in the present embodiment is a liquid crystal display device having a so-called IPS (in-plane-switching) type liquid crystal display panel which drives liquid crystal molecules by applying an electrical field across the pixel electrodes formed on one of a pair of glass substrates and the facing electrodes formed on the other glass substrate.

Figure 1:
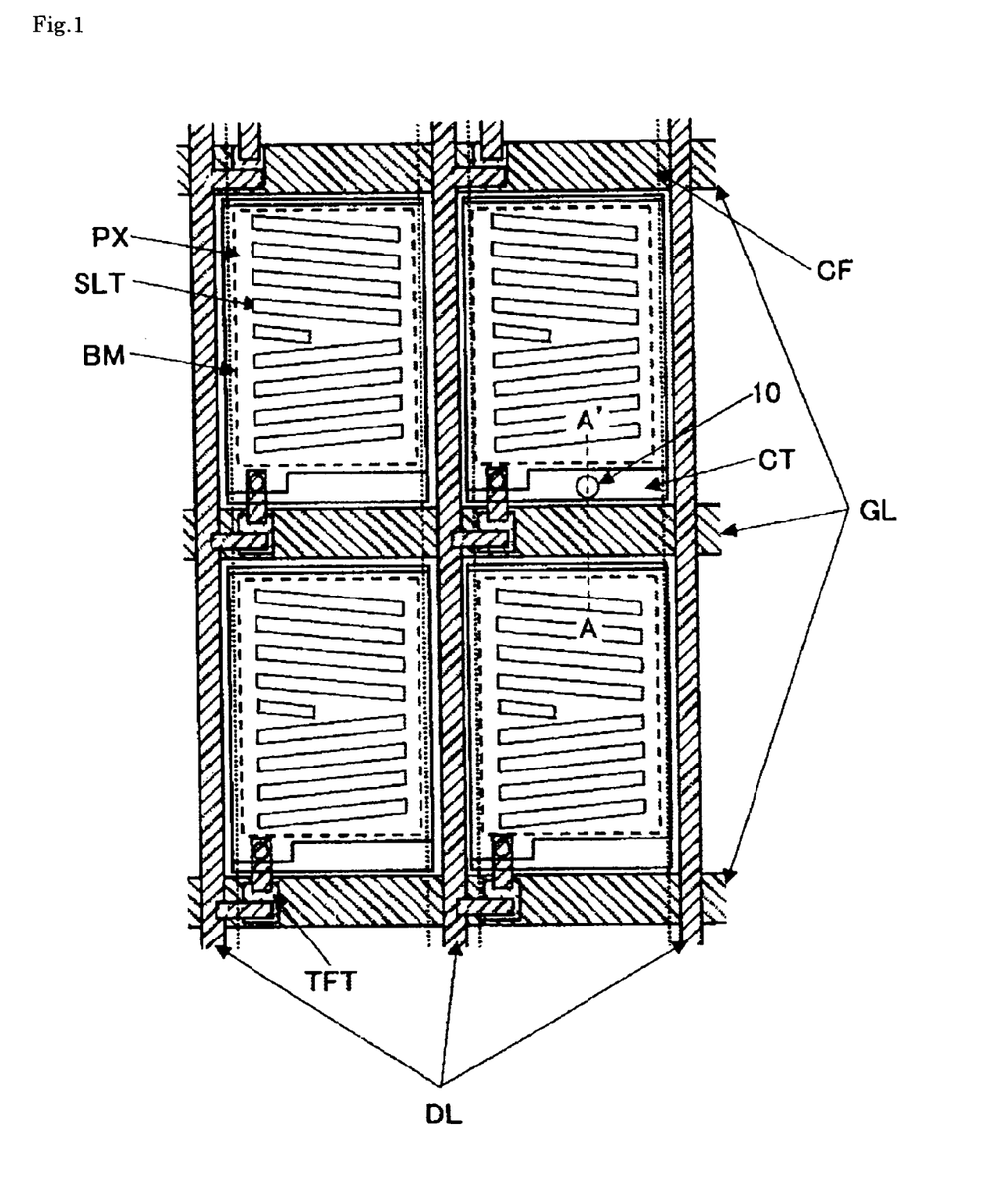
FIG. 1 is a plan diagram showing the configuration of electrodes in the liquid crystal display panel according to an embodiment of the present invention.
Figure 2:
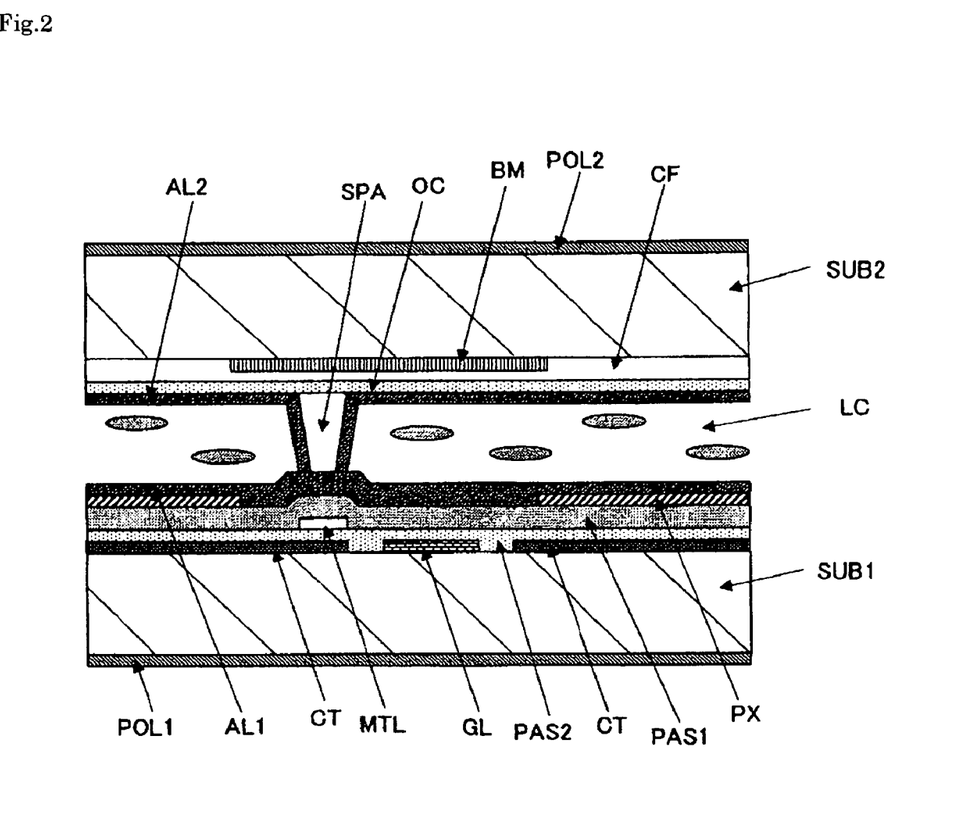
FIG. 2 is a cross sectional diagram showing the structure in a cross section along line A-A.

FIG. 1 is a plan diagram showing the configuration of electrodes in the liquid crystal display panel according to the embodiment of the present invention, and FIG. 2 is a cross sectional diagram showing the structure of a main portion in a cross section along line A-A' in FIG. 1.

In the liquid crystal display panel in the present embodiment, a TFT substrate (first substrate in present invention) and a CF substrate (second substrate in present invention) are provided so as to sandwich a liquid crystal layer (LC).

As shown in FIG. 2, the TFT substrate has a transparent substrate (for example a glass substrate) (SUB1) and scanning lines (also referred to as gate lines) (GL), facing electrodes (CT; also referred to as common electrodes), an interlayer insulating film (PAS2), an interlayer insulating film (PAS1), pixel electrodes (PX) and an orientation film (AL1) are formed in this order from the transparent substrate (SUB1) toward the liquid crystal layer (LC) on the transparent substrate (SUB1) on the liquid crystal layer side. Here, a polarizing plate (POL1) is formed on the outside of the transparent substrate (SUB1). In addition, though omitted in FIG. 2, video lines (also referred to as source lines or drain lines) (DL) and thin film transistors (TFT) are also formed on the liquid crystal layer side of the transparent substrate (SUB1).

The CF substrate has a transparent substrate (for example a glass substrate) (SUB2) and a light blocking film (BM), color filters for red, green and blue (CF), a flattened film (OC) and an orientation film (AL2) are formed in this order from the transparent substrate (SUB2) toward the liquid crystal layer (LC) on the transparent substrate (SUB2) on the liquid crystal layer side. Here, a polarizing plate (POL2) is formed on the outside of the transparent substrate (SUB2). In addition, the main surface side of the transparent substrate (SUB2) in the liquid crystal display device in the present embodiment is the side from which the display is viewed.

In addition, the facing electrodes (CT) are formed in a plane and a number of slits (SLT) are created in the pixel electrodes (PX) in a plane in the present embodiment.

In the liquid crystal display device in the present embodiment, pixel electrodes (PX) and the facing electrodes (CT) are layered on top of each other via an interlayer insulating film (PAS1), and lines of electric force in arc form are distributed between the pixel electrodes (PX) and the acing electrodes (CT) and penetrate through the liquid crystal layer (LC), and thus, change the orientation of the liquid crystal layer (LC).

The pixel electrodes (PX) and the facing electrodes (CT) are formed of a transparent conductive film, such as of ITO (indium tin oxide). Furthermore, the pixel electrodes (PX and the facing electrodes (CT) overlap via interlayer insulating films (PAS1, PAS2), and as a result, form a capacitor. Here, the interlayer insulating film (PAS1) is not limited to being of one layer, and may be made up of two or more layers.

As shown in FIG. 1, each sub-pixel is formed within a rectangular region surrounded by scanning lines (GL) and video lines (DL). In each region where a sub-pixel is formed, light is blocked by the light blocking film (BM) formed on the CF substrate (SUB2) side, and therefore, the region which essentially functions as a region where a sub-pixel is formed is an opening of a black matrix (BM) (shown by dotted lines in FIG. 1). In addition, in FIG. 1, TFT indicates thin film transistors forming active elements.

A spacer in columnar form (SPA) for keeping the distance between the pair of transparent substrates (SUB1, SUB2) constant is formed at point 10 in the transparent substrate (SUB2) in FIG. 1. This spacer in columnar form (SPA) is formed at a point on a facing electrode (CT) outside a portion where a thin film transistor (TFT) is formed on the transparent substrate (SUB1) side, as shown in FIG. 2.

The spacer in columnar form (SPA) is formed of a photosensitive resin on the flattened film (OC) on the transparent substrate (SUB2). Here, a number of spacers in columnar form (SPA) are formed on the flattened film (OC) in the actual product.

In addition, a support layer (MTL) is formed over the facing electrodes (CT) on the transparent substrate (SUB1). Here, the support layer (MTL) is formed of a first layer made of a semiconductor (amorphous silicon layer or polysilicon layer) and a second layer made of a metal, such as aluminum (Al).

Figure 3:
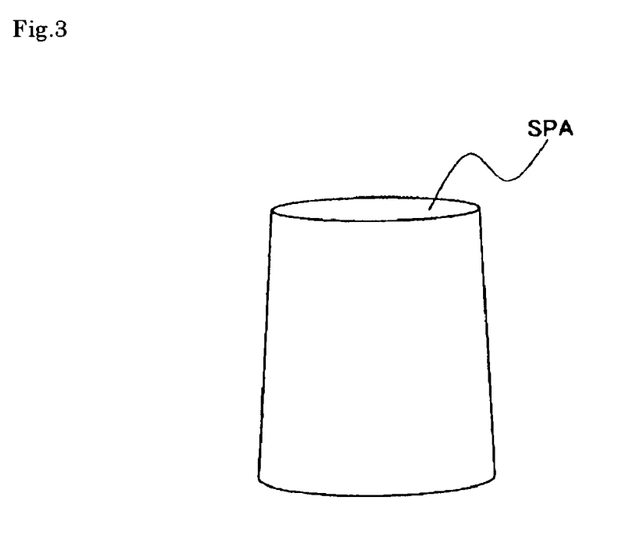
FIG. 3 is a diagram showing a spacer in columnar form according to an embodiment of the present invention.

FIG. 3 is a perspective diagram showing a spacer in columnar form (SPA) in the present embodiment.

As shown in FIG. 3, the spacers in columnar form (SPA) in the present embodiment are in columnar form with a top surface (portion having small area) makes contact with the support layer (MTL). Here, the top surface actually makes contact with the support layer (MTL) via an interlayer insulating film (PAS1) formed on top of the support layer and an orientation film (AL1).

Figure 5:
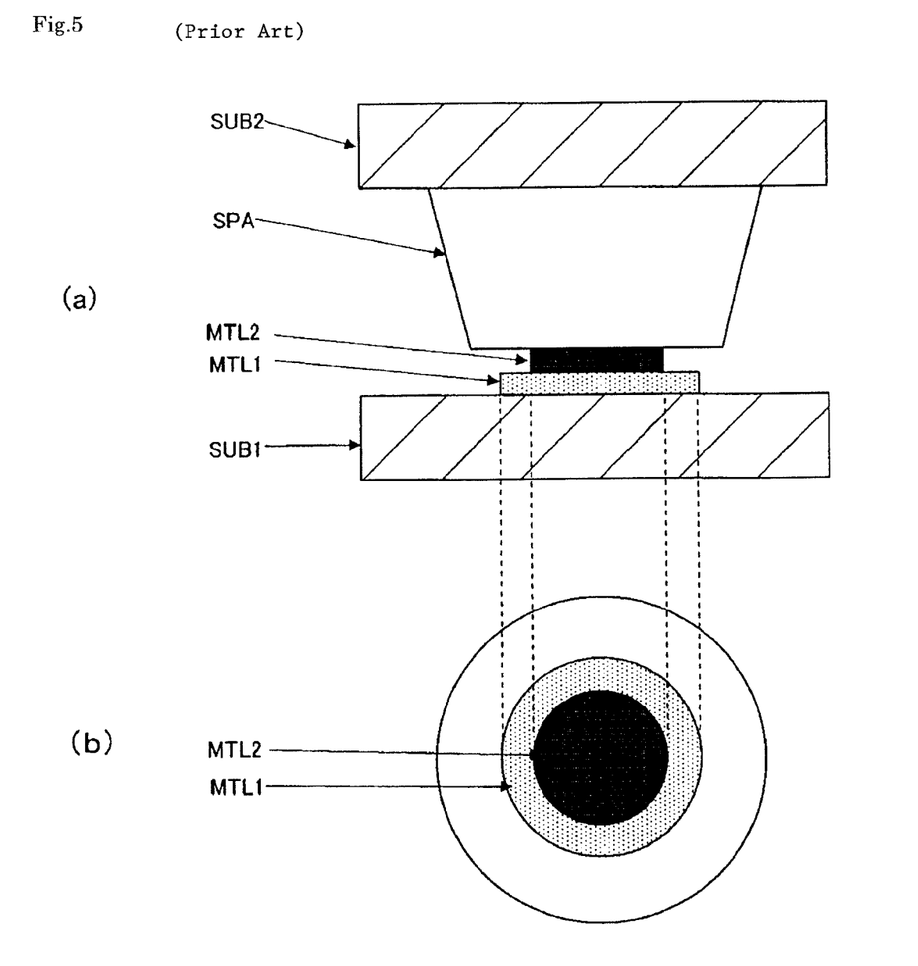
FIG. 5 is a diagram showing a conventional support layer.
Figure 41:
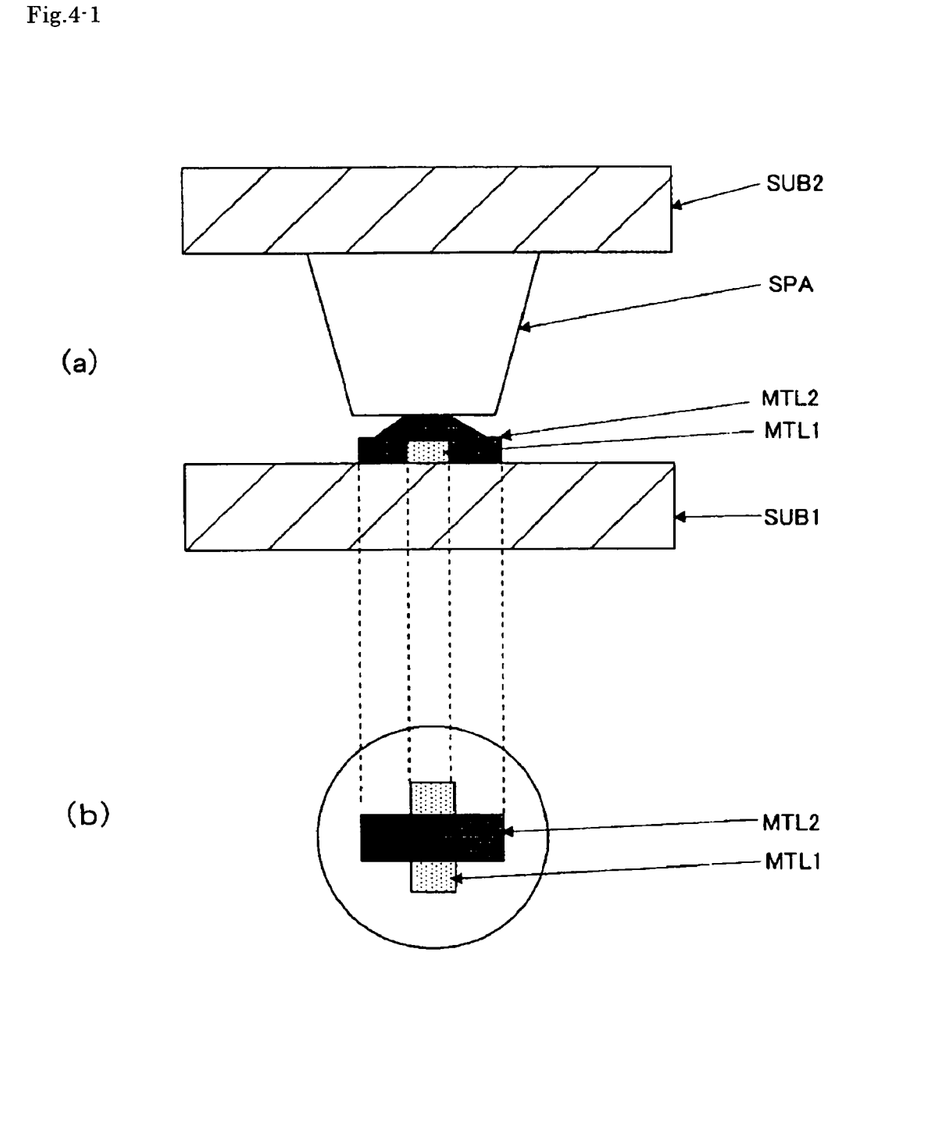
Figure 42:
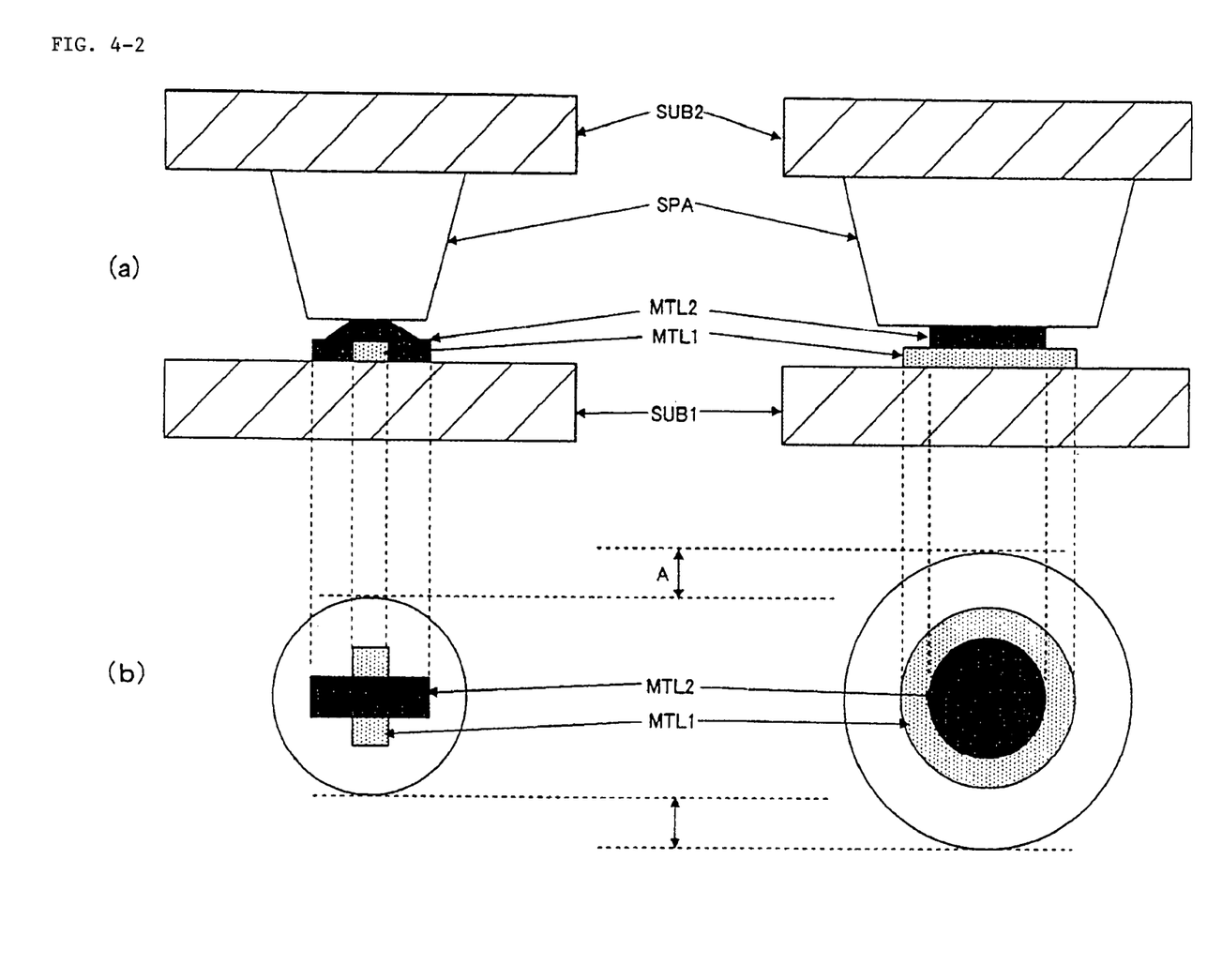

FIG. 4-1 is a diagram showing the support layer in the present embodiment, and FIG. 4-2 is a diagram comparing the support layer in the present embodiment with a conventional support layer. In addition, FIG. 5 is a diagram showing a conventional support layer. FIGS. 4-1(a), 4-2(a) and 5(a) are side diagrams, and FIGS. 4-1(b), 4-2(b) and 5(b) are plan diagrams.

Here, though as shown in FIG. 2, the support layer (MTL) is formed on the facing electrodes (CT) and the interlayer insulating film (PAS1) and the orientation film (AL1) are formed on the support layer (MTL), FIGS. 4-1, 4-2 and 5 only show the support layer (MTL) and the transparent substrate (SUB1).

Likewise, though the spacers in columnar form (SPA) are formed above the light blocking film (BM), the color filters for red, green and blue (CF) and the flattened film (OC), FIGS. 4-1, 4-2 and 5 only show one spacer in columnar form (SPA) and the transparent substrate (SUB2).

In addition, as shown in FIG. 2, the interlayer insulating film (PAS1) and the orientation film (AL1) are formed above the support layer (MTL), and therefore, the spacers in columnar form (SPA) face protrusions formed on the orientation film (AL1) (protrusions created by support layer (MTL)).

Accordingly, the area of the support layer (MTL) making contact with the spacers in columnar form (SPA) in the following description (hereinafter referred to as contact area of spacers in columnar form) is the area of protrusions formed on the orientation film (AL1) (protrusions created by support layer (MTL)).

As shown in FIGS. 4-1, 4-2 and 5, the support layer (MTL) is formed of a first layer (MTL1) made of a semiconductor and a second layer (MTL2) made of a metal both in the present embodiment and in the prior art.

As shown in FIG. 5, the first layer (MTL1) and the second layer (MTL2) in the conventional support layer (MTL) are both in disc form. Taking the precision with which the first layer (MTL1) and the second layer (MTL2) overlap in the pattern of the two layers into consideration, however, it is necessary to make the area of the first layer larger, and thus, it is difficult to apply the conventional support layer (MTL) to a liquid crystal display panel having a small sub-pixel pitch with high precision.

In this case, though it is possible to reduce the area of the support layer (MTL) to a certain extent by reducing the area of the second layer (MTL2) in the support layer (MTL), the corners of the second layer (MTL2) in the support layer (MTL) are rounded when the second layer (MTL2) in the support layer (MTL) is a pattern of small dots, so that the inconsistency in the size becomes great under the influence of fluctuation in the process, and thus, the contact area of the spacers in columnar form in the support layer (MTL) may fluctuate.

As shown in FIGS. 4-1 and 4-2, in the present embodiment, the spacers in columnar form (SPA) are small in comparison with those in the prior art. In FIG. 4-2, the area of the bottom of the spacer in columnar form (SPA) is smaller by the portion indicated by arrow A.

In addition, the support layer (MTL) in the present embodiment is formed of a first layer (MTL1) and a second layer (MTL2) which are rectangular in a plan view. Here, the first layer (MTL1) and the second layer (MTL2) cross at a right angle as viewed from the top.

That is to say, the support layer (MTL) in the present embodiment is formed of a first layer (MTL1) extending in a first direction and a second layer (MTL2) extending in a second direction which crosses the first direction at an angle of 90°. Accordingly, in the present embodiment, the contact area of the spacer in columnar form in the support layer (MTL) is the area of the portion where the first layer (MTL1) and the second layer (MTL2) overlap.

In general, the first layer (MTL1) and the second layer (MTL2) are formed in accordance with a photolithographic technology, and rectangular patterns can be formed with higher precision than circular patterns in the case where patterns of a small area are formed in accordance with a photolithographic technology.

Accordingly, in the present embodiment, fluctuation in the size of the first layer (MTL1) and the second layer (MTL2) can be kept small, and as a result, it becomes possible to implement a small support layer (MTL) with a stable contact area of the spacer in columnar form even in the case where the spacers in columnar form (SPA) are miniaturized in the present embodiment.

Here, in the present embodiment, it is not necessary for the first layer (MTL1) and the second layer (MTL2) to cross at a right angle, and the first layer (MTL1) and the second layer (MTL2) may cross at an angle of 70° to 110°.

In addition, it is desirable for the form of the support layer (MTL) in a plan view to be smaller than the form of the spacers in columnar form (SPA) in a plan view. In addition, it is possible to change the material for the first layer (MTL1) and the second layer (MTL2) in the support layer (MTL) to another appropriate one.

In addition, though a case where the spacers in columnar form (SPA) are round columns is described in the above, it is also possible to use spacers in quadrangular prism form or polygonal prism form. In addition, the support layer (MTL) may be formed on the scanning lines (GL) on the transparent substrate (SUB1).

Furthermore, though an embodiment where the present invention is applied to an IPS type liquid crystal display device is described in the above, the present invention is not limited to this, and can be applied to TN (twisted nematic) type, ECB (electrically controlled birefringence) type and VA (vertically aligned) type liquid crystal display devices, for example. Here, in the case where the present invention is applied to such liquid crystal display devices, the facing electrode (CT) may be formed on the CF substrate (SUB2) side.

As described above, the present embodiment makes it possible to implement a high-quality liquid crystal display panel where a sufficient allowance in terms of the "unevenness in the gap caused by high temperatures," the "unevenness caused through rubbing" and the "unevenness caused through pressing" is secured.

Furthermore, in the present embodiment, the area of the support layer (MTL) can be reduced, and therefore, the area in the openings for the sub-pixels can be increased, and thus, the transmissivity of the liquid crystal display panel can be increased, and therefore, it becomes possible to easily implement a liquid crystal display panel with high brightness.

Though the invention made by the present inventor is described concretely on the basis of the above described embodiment, the present invention is not limited to the above described embodiment, and various modifications are, of course, possible within such a scope as not to deviate from the gist of the invention.

The invention claimed is:

1. A liquid crystal display device, comprising:
   a first substrate;
   a second substrate; and
   a liquid crystal display panel having liquid crystal sandwiched between said first substrate and said second substrate; characterized in that
   said second substrate has spacers in columnar form;
   said first substrate has a support layer in a region where said spacers in columnar form are formed;
   said support layer has a first layer in a form of an elongated strip extending in a first direction, and a second layer in a form of an elongated strip formed on said first layer and extending in a second direction which crosses said first direction at an angle of 70° to 110° so that said second layer crosses said first layer and extends in said second direction beyond edges of said elongated strip of said first layer which extends in said first direction; and
   and said second layer overlap only at a center region of said support layer where said first and second layer cross and form a thick-layered portion of said support layer thereat with respect to a thickness of other portions of said support layer, said thick-layered portion of said support layer being in contact with one of said spacers of said second substrate.

2. The liquid crystal display device according to claim 1, characterized in that said second direction crosses said first direction at an angle of 90°.

3. The liquid crystal display device according to claim 1, characterized in that said first layer and said second layer of said support layer are rectangular in a plan view.

4. The liquid crystal display device according to claim 3, characterized in that
   said first layer of said support layer is a semiconductor layer, and
   said second layer of said support layer is a metal layer.

5. The liquid crystal display device according to claim 3, characterized in that said spacers in columnar form are formed of a photosensitive resin.

6. The liquid crystal display device according to claim 1, characterized in that
   said liquid crystal display panel has a number of sub-pixels,
   said first substrate has scanning lines for inputting a scanning voltage into said number of sub-pixels, and
   said support layer is provided on said scanning lines.

7. The liquid crystal display device according to claim 1, characterized in that
   said liquid crystal display panel has a number of sub-pixels,
   each of said number of sub-pixels has a facing electrode, and said support layer is provided on said facing electrodes.

8. The liquid crystal display device according to claim 6, characterized in that said first substrate has an orientation film on the surface on said liquid crystal side, and said support layer is provided between the first substrate and said orientation film.

9. The liquid crystal display device according to claim 1, characterized in that the elongated strip of said first layer extends in said first direction beyond edges of said elongated strip of said second layer which extends in said second direction so that said first layer and said second layer overlap only at said center region of said support layer.

* * * * *